US011247923B2

United States Patent
Domrese et al.

(10) Patent No.: US 11,247,923 B2
(45) Date of Patent: Feb. 15, 2022

(54) GAS INJECTION SYSTEMS FOR OPTIMIZING NANOBUBBLE FORMATION IN A DISINFECTING SOLUTION

(71) Applicants: Brian C. Domrese, Charleston, SC (US); Steve Gareleck, Marietta, GA (US)

(72) Inventors: Brian C. Domrese, Charleston, SC (US); Steve Gareleck, Marietta, GA (US)

(73) Assignee: NBOT Systems LLC, Mount Pleasant, SC (US)

( * ) Notice: Subject to any disclaimer, the term of this patent is extended or adjusted under 35 U.S.C. 154(b) by 112 days.

(21) Appl. No.: 16/832,308

(22) Filed: Mar. 27, 2020

(65) Prior Publication Data
US 2020/0308032 A1 Oct. 1, 2020

Related U.S. Application Data

(60) Provisional application No. 62/825,491, filed on Mar. 28, 2019, provisional application No. 62/969,729, filed on Feb. 4, 2020.

(51) Int. Cl.
*C02F 1/78* (2006.01)
*B01F 3/04* (2006.01)
(Continued)

(52) U.S. Cl.
CPC ............ *C02F 1/78* (2013.01); *B01F 3/04503* (2013.01); *B01F 5/0415* (2013.01); *B01F 5/102* (2013.01);
(Continued)

(58) Field of Classification Search
CPC ...... C02F 1/78; C02F 1/46; C02F 1/32; B01F 3/04; B01F 5/04; B01F 5/10
See application file for complete search history.

(56) References Cited

U.S. PATENT DOCUMENTS 5,133,882 A 7/1992 Stearns
6,250,609 B1 6/2001 Cheng et al.
(Continued)

FOREIGN PATENT DOCUMENTS

CA 2988574 A1 10/2016
CN 108144465 A 6/2018
(Continued)

OTHER PUBLICATIONS

PCT International Searching Authority, International Search Report and Written Opinion, dated Jun. 11, 2020, for International Application PCT/US2020/025515 filed by Nanopure LLC, pp. 1-10 (ISA/US Alexandria, Virginia US).

*Primary Examiner* — Walter D. Griffin
*Assistant Examiner* — Cameron J Allen
(74) *Attorney, Agent, or Firm* — Culhane Meadows, PLLC

(57) ABSTRACT

Systems, devices, and methods are presented for optimizing the formation of gas nanobubbles in a disinfecting solution. In an example system for treating contaminated water, a centrifugal pump draws the water from a reservoir and circulates the water in and through a circuit of elements including a mixing chamber in the pump, a pressure vessel, a backflow valve, a Venturi injector, and a pair of nozzles immersed in the reservoir. The system injects ozone-rich gas into the fluid to produce an aqueous solution containing a volume of gas nanobubbles. The nozzles release the gas nanobubbles into the reservoir, creating highly reactive compounds that destroy organic compounds and other contaminants in the water.

7 Claims, 3 Drawing Sheets

(51) Int. Cl.
*B01F 5/10* (2006.01)
*B01F 5/04* (2006.01)
*C02F 101/30* (2006.01)

(52) U.S. Cl.
CPC .... *B01F 5/106* (2013.01); *B01F 2003/04886* (2013.01); *B01F 2215/0052* (2013.01); *C02F 2101/30* (2013.01); *C02F 2201/005* (2013.01); *C02F 2201/782* (2013.01); *C02F 2201/784* (2013.01); *C02F 2301/046* (2013.01); *C02F 2303/04* (2013.01)

(56) References Cited

U.S. PATENT DOCUMENTS

| | | |
|---|---|---|
| 9,156,044 B2 | 10/2015 | Sventitsky et al. |
| 10,315,170 B2 | 6/2019 | Maeda et al. |
| 10,588,992 B2 | 3/2020 | Frische et al. |
| 2005/0279713 A1* | 12/2005 | Osborn ................ B01F 5/0498 210/760 |
| 2011/0135757 A1 | 6/2011 | Sventitsky et al. |
| 2012/0256329 A1* | 10/2012 | Katayama ............... A23L 27/60 261/36.1 |
| 2018/0141837 A1 | 5/2018 | Kim |

FOREIGN PATENT DOCUMENTS

| | | |
|---|---|---|
| KR | 1013676950000 B1 | 2/2014 |
| KR | 1019697720000 B1 | 4/2019 |
| WO | 2006000170 | 1/2006 |

\* cited by examiner

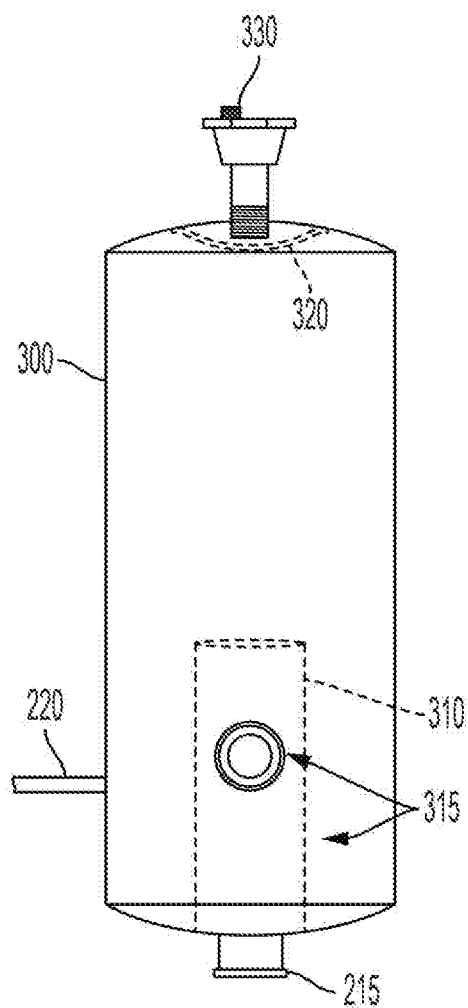
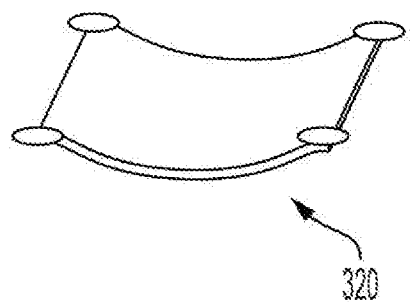
FIG. 2A
FIG. 2B

GAS INJECTION SYSTEMS FOR OPTIMIZING NANOBUBBLE FORMATION IN A DISINFECTING SOLUTION

CROSS REFERENCE TO RELATED APPLICATIONS

The present application claims the benefit of and priority to both U.S. Provisional Application 62/825,491, filed Mar. 28, 2019, entitled "Backflow Device for Optimizing the Formation of Nano-bubbles in a Fluid," and U.S. Provisional Application 62/969,729, filed Feb. 4, 2020, entitled "Systems and Methods of Infusing Nano-bubbles of Enriched Gas into a Fluid to Create a Solution for Removing Pollutants," each of which is incorporated herein in its entirety.

TECHNICAL FIELD

Examples set forth in the present disclosure relate to the field of air and water treatment systems. More particularly, but not by way of limitation, the present disclosure describes methods and systems for optimizing the formation of gas nanobubbles in a disinfecting solution.

BACKGROUND

Conventional water treatment systems use a variety of chemicals, most of which are not environmentally friendly, to remove microbial toxins and pathogens. Treating large bodies of open water such as lakes, ponds, and livestock waste pools is currently too expensive and not technologically feasible. Untreated waste often includes large amounts of methane, nitrogen, and other substances that raise concerns about environmental impact. Ballast water released from cargo ships can contaminate bays and inlets around ports. Concern is also increasing about the threat of terrorist activity that might be directed toward the water supply, as well as natural water sources and environments. Existing systems for disinfecting and sterilizing the air in a room, surfaces, medical equipment, and other components are expensive, time-consuming, and in many cases are not fully effective. Many types of microbes and pathogens, including viruses, can survive on surfaces and in enclosed spaces for a lengthy period of time unless treated.

BRIEF DESCRIPTION OF THE DRAWINGS

Features of the various implementations disclosed will be readily understood from the following detailed description, in which reference is made to the appending drawing figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures:

FIG. 2A is a schematic view of a pressure vessel suitable for use with the gas-injection system of FIG. 1;

FIG. 2B is a perspective illustration of a deflector, according to some example implementations;

DETAILED DESCRIPTION

Figure 1:
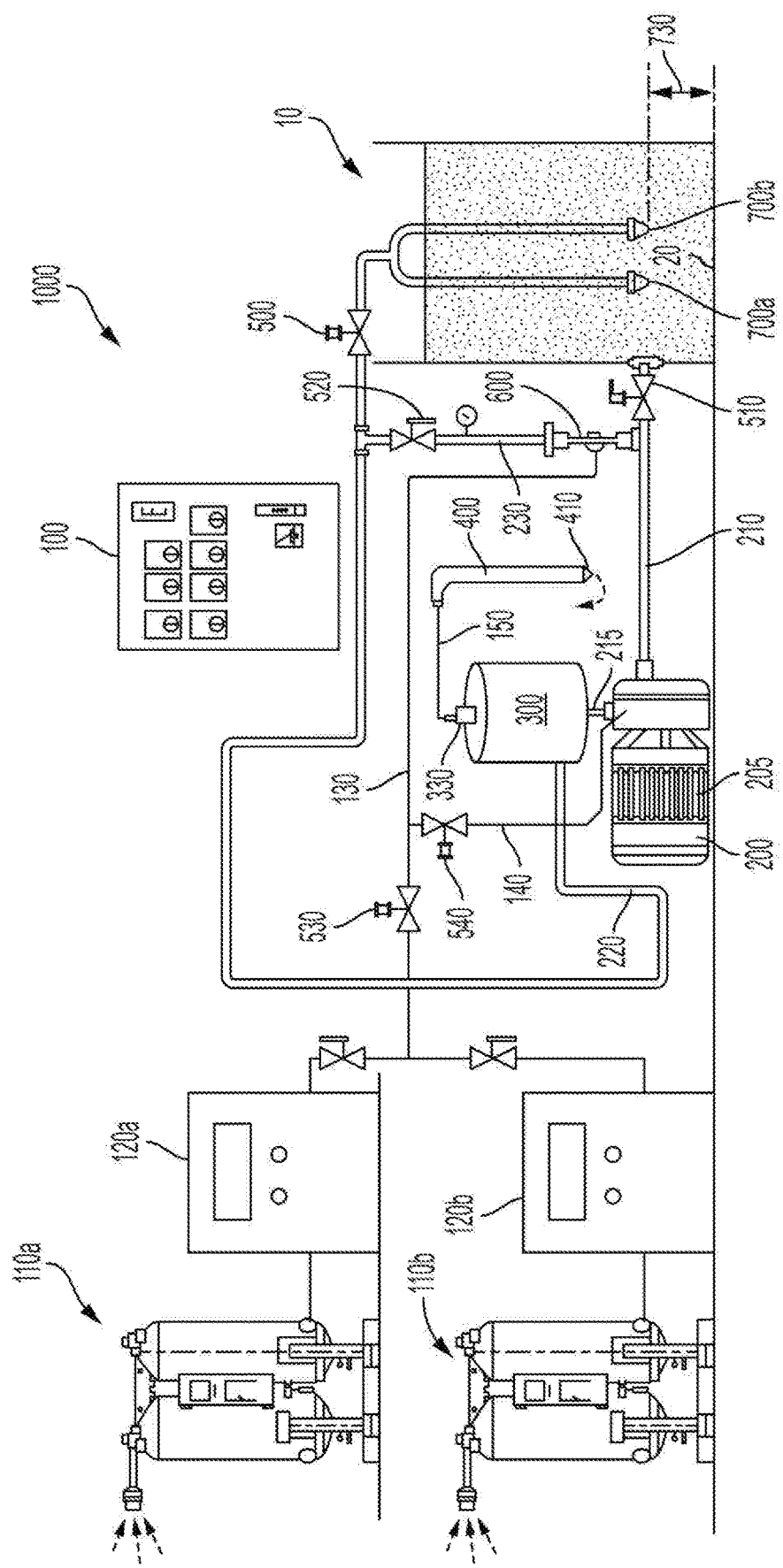
FIG. 1 is a schematic illustration of a gas-injection system, according to an example implementation.

The present systems and apparatuses and methods are understood more readily by reference to the following detailed description, examples, and drawings. The terminology used herein is for the purpose of describing particular aspects only and is not intended to be limiting.

Like parts are marked throughout the following description and drawings with the same reference numerals. The drawings may not be to-scale and certain features may be shown exaggerated in scale or in somewhat schematic format in the interest of clarity, conciseness, and to convey information.

The following description is provided as an enabling teaching in its currently known embodiment. To this end, those skilled in the relevant art will recognize and appreciate that many changes can be made to the various aspects described herein, while still obtaining the beneficial results. It will also be apparent that some of the desired benefits can be obtained by selecting some of the features described without utilizing others. Accordingly, those who work in the art will recognize that many modifications and adaptations to the examples described are possible and can even be desirable in certain circumstances and are a part of this disclosure. Thus, the following description is provided as illustrative of the principles and not in limitation.

As used throughout, the singular forms "a," "an" and "the" include plural referents unless the context clearly dictates otherwise. Thus, for example, reference to a component can include two or more such components unless the context indicates otherwise.

Ranges can be expressed herein as from "about" one particular value and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

As used herein, the term "facilitate" means to aid, assist, or make easier. The term "inhibit" means to impede, interfere with, hinder, or delay the progress.

As used herein, the terms "proximal" and "distal" are used to describe items or portions of items that are situated closer to and away from, respectively, another item or a user. Thus, for example, the far end of a pipe attached to a vessel may be referred to as the distal end because it is far away relative to the vessel.

The terms "coupled" or "connected" as used herein refer to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals.

The term "nanobubble" as used herein refers to and includes bubble diameters between about ten nanometers and about four hundred microns. A nanometer is one billionth of a meter (1.0E-9 meter). A micron or micrometer equals one millionth of a meter (1.0E-6 meter).

A solution is a liquid mixture in which a minor component, called a solute (such as an enriched gas) is dissolved into a major component, called the solvent (such as water, for aqueous solutions). The quantity of solute that can be dissolved into a solvent varies, depending on several factors such as temperature and the solubility of the solute. The capacity of a solute to be dissolved in a solvent is known as solubility. Solubility is a chemical property of the solute and does not change.

A solution is saturated when it contains the largest possible quantity of the solute (such as enriched gas) that can be dissolved into the solvent under normal conditions. Special conditions, such as kinetic mixing, injection at higher pressures, higher temperatures, and/or for long durations, are typically required in order to inject additional solute into the solvent. The forced addition of more solute, in some cases, produces a solution. A solution of gases in a liquid will typically form bubbles. Carbonated water is an example of an aqueous solution supersaturated with carbon dioxide gas.

The term "injected" as used herein means and refers to the forced injection of additional gas (solute) into the fluid (solvent) which, under some conditions, produces a supersaturated solution. The term "released" as used herein refers to the opposite process, during which gas bubbles that were once dissolved in a fluid solution are un-dissolved or released.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Although the various embodiments and implementations are described with reference to an example system for optimizing bubble size and concentration in a fluid mixture to improve its usefulness in decontamination applications, the systems and methods described herein may be applied to and used with any of a variety of other systems.

Reference now is made in detail to the examples illustrated in the accompanying drawings and discussed below.

FIG. 1 is a schematic illustration of a gas-injection system 1000, according to an example implementation. The system 1000 includes a centrifugal pump 200 for circulating a in and through a circuit of elements, wherein each element is in fluid communication with the next. The circuit of elements, in this example, includes the centrifugal pump 200, a pressure vessel 300, a backflow valve 500, a Venturi injector 600, and a pair of nozzles 700a, 700b immersed in the reservoir 10 of contaminated fluid. The contaminated fluid may be water, saltwater, another liquid, or a gas in fluid state, such as air. The circuit of elements is monitored, adjusted, and controlled by a control unit 100, as described herein. The circuit of elements is closed, recirculating the fluid for treatment until a desired quantity of pollutants is removed from the fluid. The term pollutant is used herein in its broadest sense, to include any of a variety of substances to be removed from the fluid.

The system 1000 also includes a gas supply, which may supply one or more gases (e.g., ozone, oxygen, hydrogen). The gas supply, in some implementations, includes one or more oxygen concentrators 110a, 110b for converting ambient air into an oxygen-enriched gas. Some types of oxygen concentrators can process about thirty liters per minute and generate an oxygen enrichment of about ninety-two percent. Larger concentrators and other equipment can be used to scale-up the system that handle larger volumes of fluids and gases. The gas supply also includes one or more ozone generators 120a, 120b for converting the oxygen-enriched gas into an ozone-rich gas. The ozone-rich gas enters the circuit of elements at the pump 200 and at the Venturi injector 600. The system 1000 also includes an ozone destructor 400 for capturing excess ozone and converting it to oxygen. In other example implementations, one or more different gases may be used. For example, the system may first infuse an ozone-rich gas to clean a reservoir of water, followed by an injection of oxygen-rich gas to remove any excess ozone, followed by an injection of additional oxygen and/or hydrogen to increase the concentrations of such gases in the water and thereby create a drinking water that is infused with such gases.

The centrifugal pump 200 includes a mixing chamber 205 where the contaminated fluid mixes with a gas (e.g., an ozone-rich gas). The centrifugal pump 200 includes one or more drive rotors called impellers inside the mixing chamber 205 to promote mixing and facilitate the injection of gas into the fluid. In a centrifugal pump 200, the fluid enters the mixing chamber 205 near the center of the rapidly rotating impellers, which force the fluid by centrifugal force outwardly (i.e.; radially, relative to the center of the impellers). In an alternative implementation, the mixing chamber 205 includes one or more gears, pairs of gears, or other agitators to promoting mixing. The gas enters the mixing chamber 205 under relatively high pressure, causing the gas to dissolve in the fluid, which causes bubbles to form. Controlling the volumes and pressures of fluid and gas facilitates the formation of smaller and smaller bubbles, some of which are nanobubbles. The gas supply, as shown, injects a first quantity of gas into the fluid, inside the mixing chamber 205, to produce a first solution. The first solution may or may not be fully saturated with gas. The first solution contains a first volume of gas nanobubbles.

The gas flows to the pump 200 through a gas inlet tube 140, which may include a first control valve 540. The contaminated fluid flows to the pump 200 through an inlet pipe 210, which may include an inlet valve 510 for controlling the flow from the reservoir 10. The inlet valve 510 also prevents fluid from draining out of the reservoir 10 when the system 1000 is not in use. The inlet pipe 210 may also include a priming pump (not shown) for initiating the flow of fluid into the circuit, which is particularly useful when the system starts to operate. The inlet pipe 210 and other pipes carrying the fluid may be made of PVC, flexible hose, or another suitable material capable of withstanding the pressures and temperatures of the system 1000.

The pressure vessel 300 is mounted above the pump 200 in this example. The pressure vessel 300 is configured to receive the first solution from the pump 200, and hold the first solution under an internal pressure, and for a selected duration. The pressure and duration are set, adjusted, and controlled by the control unit 100. The combination of pressure and time facilitates the additional injection of gas nanobubbles—both inside the pressure vessel 300 and inside the mixing chamber 205, due to the backflow pressure generated by the pressure vessel 300. The combination of pressure and time produces a second solution, which contains a second volume of gas nanobubbles (in addition to the first volume injected inside the mixing chamber 205 of the pump 200.

The second solution, in some implementations, exits the pressure vessel 300 and flows through the outlet pipe 220 to a pair of nozzles 700a, 700b which are configured to spray the second solution into the reservoir 10. As shown in FIG. 1, the Y-shaped splitter pipe may be symmetrical in order to evenly divert the flow into the pair of nozzles 700a, 700b. Like the pressure vessel 300, the nozzles 700a, 700b generate a backflow pressure into the system, which facilitates the additional injection of nanobubbles in the elements located upstream. The nozzles 700a, 700b are spaced apart from one another and immersed in the reservoir 10 to a depth located at a mean height 730 above the reservoir floor 20. The nozzles 700a, 700b, in some implementations, are suspended above the reservoir floor 20 by one or more floats and counterweights (not shown), especially in environments subject to tidal changes or other volume-related fluctuations. The nozzles 700a, 700b are sized and shaped to release a portion of the volumes of gas nanobubbles into the fluid in the reservoir 10. The release of the nanobubbles injects the gases that were dissolved in the second solution. For implementations in which the gas is an ozone-rich gas, the release of nanobubbles creates hydroxyl radicals which are highly reactive and useful in destroying organic compounds and other contaminants.

The second solution, in another example implementation, exits the pressure vessel 300 and flows through an outlet pipe 220 to a backflow valve 500 before flowing into the nozzles 700a, 700b. The backflow valve 500 is positioned within the outlet pipe 220 and is constructed and otherwise configured to selectively restrict the flow of the second solution through the outlet pipe 220. By restricting the flow through the outlet pipe 220, the backflow valve 500 generates a significant backflow pressure in the system, which facilitates the additional injection of nanobubbles in the elements located upstream. The backflow pressure increases the internal pressure inside the pressure vessel 300 and prolongs the duration of time for mixing inside the pressure vessel 300. The backflow pressure, to some extent, also affects the pressure and mixing time inside the mixing chamber 205 of the pump 200. The combination of increased pressure and a longer mixing time causes the pressure vessel 300 to produce a third solution, which contains a third volume of gas nanobubbles (in addition to the first volume injected inside the mixing chamber 205 of the pump 200, and in addition to the second volume injected inside the pressure vessel 300 in a system that does not include a backflow valve). After passing through the backflow valve 500, the third solution is injected into the reservoir 10 through the nozzles 700a, 700b as described herein.

The system 1000 illustrated in FIG. 1 also includes a circuit for recirculating the solution back into the centrifugal pump 200. As shown, a recirculation pipe 230 is configured to deliver a selected portion of the solution from the outlet pipe 220 and back into the inlet pipe 210. The recirculation pipe 230 includes a recirculation valve 520 to control the flow; in other words, to control the selected portion of the solution to be recirculated. The recirculation pipe 230 includes a Venturi injector 600 which, as the name suggests, is sized and shaped to create the Venturi effect as the solution flows through it. The Venturi injector 600 includes a suction port in the side wall of the lengthwise chamber through which the solution flows. A supplemental gas inlet tube 130 is connected to the suction port and configured to carry the ozone-rich gas. The gas inlet tube 130, in some implementations, does not include a control valve, instead relying on the suction generated by the Venturi injector 600 to draw gas through the inlet tube 130. The gas valve 540 in the gas supply tube 140 to the pump 200 can be adjusted when the Venturi injector 600 is operating, in order to balance the supply of gas.

The lengthwise chamber is sized and shaped to create a pressure differential, which is sufficient to draw a supplemental quantity of gas through the suction port and into the selected portion of the solution. The injection of supplemental gas produces a fourth solution, which contains a fourth volume of gas nanobubbles (in addition to the first volume injected inside the mixing chamber 205 of the pump 200, and in addition to the second volume injected inside the pressure vessel 300). The fourth solution next flows into the main inlet pipe 210 and back into the centrifugal pump 200 for additional mixing and injection of additional gas.

The system 1000, in some implementations, may deliver the ozone-rich gas either (a) through the inlet tube 140 only, directly into the centrifugal pump 200, (b) through the supplemental gas inlet tube 130 only, directly into the Venturi injector 600, or (c) through both inlet tubes 140, 130—in which case the pump 200 and the Venturi injector 600 cooperate to improve the quality and quantity of nanobubbles in the solution.

The control unit 100 is connected and configured to set, monitor, adjust, and otherwise control the system 1000, as described herein, including the gas supply, the centrifugal pump 200, the pressure vessel 300, the backflow valve 500, the Venturi injector 600, and the oxygen destructor 400, as well as the valves located in the piping and tubing that connects the elements of the system 1000.

For example, the control unit 100, in some implementations, controls the oxygen concentrators 110a, 110b, the ozone generators 120a, 120b, and the gas valves 530, 540 that control the flow of gas in the system 1000. The control unit 100 controls the speed of the motor driving the pump 200, the internal pressure inside the pressure vessel 300, the backflow valve 500, and the Venturi injector 600, as well as the fluid valves 510, 520 that control flow of fluid in the system 1000.

By and through its connections to the system 1000, the control unit 100 also gathers and stores information about flow velocities, pressures, temperatures, and other conditions. By adjusting the valves and other elements in the system 1000, the control unit 100 balances the flow velocities, pressures, and temperatures between and among the system elements in order to optimize the generation of nanobubbles. In this aspect, adjustments to the system parameters made by the control unit 100 cause the system 1000 as a whole to generate a larger quantity and concentration of nanobubbles, a higher quality of nanobubbles, and a more stable solution at various stages throughout the circuit so that the nanobubbles are retained in solution until they reach the nozzles 700a, 700b.

The control unit 100, in some implementations, includes a programmable logic controller (PLC) that operates and controls a power supply, timers and counters, a processor (e.g., a CPU) connected to a memory (e.g., for storing programming and maintaining a log of temperatures and pressures), a plurality of input-output interfaces through which the PLC receives and sends data to and from external device, and a communications interface for sending and receiving data to and from remote devices, such as computers and mobile device (e.g., to facilitate remote control and remote access to the data and settings).

The PLC through its input-output interfaces is adapted to interact with external controllers, such as the motor 500 that controls the backflow valve assembly 500b (FIG. 3B) and the motors that control the settings on the gas valves and fluid valves. The control unit 100 and/or its PLC, in some implementations, includes a variable-frequency drive (VFD) for controlling the motor driving the pump 200, which is particularly useful during system startup and power-down.

The control unit 100 and/or its PLC may include one or more redundant or backup modules to prevent total or partial shutdown of the system 1000 due to hardware failure or power interruption. Emergency shutoff sequences and alarms may be activated in case of hardware failure, excess pressures or temperatures, or other types of system overloads.

FIG. 2A is a schematic view of a pressure vessel 300 suitable for use with the example gas-injection systems described herein. The pressure vessel 300 receives a flow of the first solution from the pump 200 through a connecting pipe 215. At the bottom of the pressure vessel 300, the first solution flows through a diverter pipe 310, as shown. The diverter pipe 310 extends lengthwise, and in a substantially vertical orientation, from a base end at the bottom of the pressure vessel 300 to a distal end. The distal end of the diverter pipe 310 may be located near the center of the pressure vessel 300, to facilitate mixing. As shown, the side wall of the diverter pipe 310 includes a plurality of perforations 315. The first solution exits the pipe 310 through the perforations 315 and into the pressure vessel 300. The perforations 315 may be any of a variety of sizes and shapes designed to facilitate mixing and injection.

The pressure vessel 300 includes a vent 330 for releasing the excess volume of the ozone-rich gas. Instead of releasing this excess ozone-rich gas into the atmosphere, the excess volume travels through a vapor tube 150 into an ozone destructor 400, as shown in FIG. 1.

As shown in FIG. 2A, the pressure vessel 300 also includes a deflector 320. The deflector 320 is sized and shaped, and positioned, to selectively inhibit the incoming flow of the first solution from flowing into the vent 330. In this aspect, the deflector 320 prevents the incoming solution from spraying or otherwise flowing into the vent 330, which is designed to capture excess gas and not fluid. The fluid exits through the outlet pipe 220. The deflector 320 is also sized and shaped, and positioned, to selectively inhibit the flow of ozone-rich gas from entering the vent 330 too soon. The pressure vessel 300 is designed to hold the first solution, under pressure, for a selected duration, as described herein.

FIG. 2B is a perspective illustration of an example deflector 320, which is made from a metal plate, one-eighth inch thick and generally rectangular in shape. The example deflector 320 is a curved plate with its four corners welded to the ceiling or upper surfaces inside the pressure vessel 300 near the vent 330. The excess flow of ozone-rich gas, in this example, may flow around the side edges of the example deflector 320 and into the vent 330. The deflector 320, in some implementations, may be made from another material, formed into other shapes and sizes, and may include perforations or other openings to allow the excess flow of ozone-rich gas to enter the vent 330. The pressure inside the pressure vessel 300 is selected to facilitate additional mixing and injection. When the selected pressure is exceeded, the excess flow of ozone-rich gas will enter the vent 330.

Referring again to FIG. 1, the system 1000, in some implementations, includes an ozone destructor 400 for capturing an excess volume of the ozone-rich gas from the pressure vessel 300. This excess volume is characterized by its having not been infused into the first solution. The ozone destructor 400 includes a catalyst for converting substantially all the ozone in the excess volume to oxygen, and an outlet 401 for venting the oxygen (directly to the atmosphere, in some implementations). The catalyst may be a compound such as manganese dioxide, copper oxide, or other suitable compounds, or mixtures thereof. The ozone destructor 400, in various implementations, may include a heater, one or more vanes or other structures for directing the flow of gas through the chamber, filter media in addition to the catalyst, and a fan for drawing the gas through the chamber and/or expelling the oxygen through the outlet 401. For systems in which the gas is not an ozone-rich gas, the ozone destructor 400 may be replaced with another type of system for safely handling excess gas before it is released to the atmosphere.

Figure 3A:
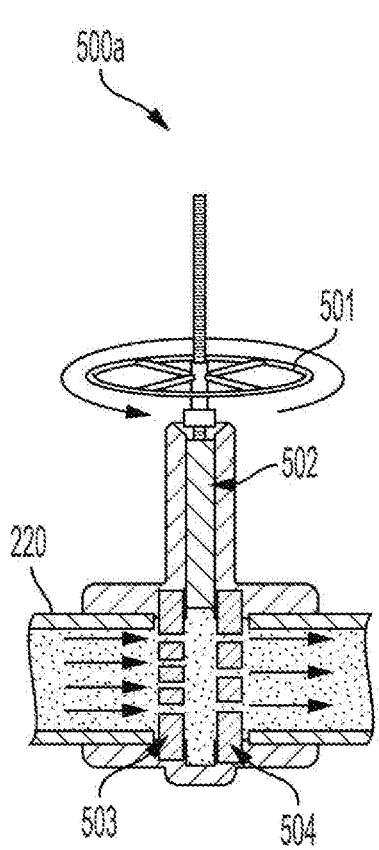
FIG. 3A is an illustration of a backflow valve assembly with a manual control, according to some example implementations.

FIG. 3A is a cross-sectional illustration of a backflow valve assembly 500a with a manual control, located in the outlet pipe 220. The backflow valve assembly 500a, in some implementations, includes a handle 501 configured to lower and raise a blade 502 into the pipe 220 to modify the flow of fluid therethrough and thereby generate a backflow pressure in the elements located upstream, as described herein. The blade 502 may be constructed of a solid stainless-steel plate having a thickness of between about one eighth and one quarter of an inch. The solid blade 502 is sized and shaped to fit between an upstream plate 503 and a downstream plate 504. The plates 503, 504 include one or more drilled holes or openings, as shown.

Figure 3B:
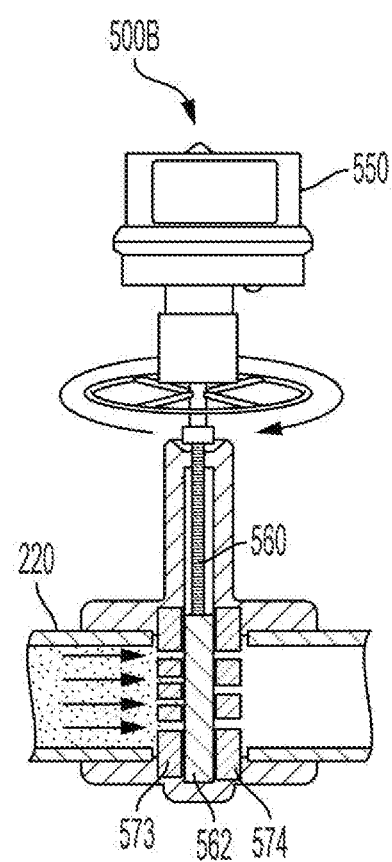
FIG. 3B is an illustration of a backflow valve assembly with motorized control, according to some example implementations.

FIG. 3B is a cross-sectional illustration of a backflow valve assembly 500b with a motorized control, located in the outlet pipe 220. The backflow valve assembly 500b, in this example, includes a motor 550 connected to a shaft 560 that is configured to lower and raise a blade 560 into the pipe 220 to modify the flow of fluid therethrough and thereby generate a backflow pressure in the elements located upstream, as described herein. The blade 560 may be constructed of a solid stainless-steel plate having a thickness of between about one eighth and one quarter of an inch. The solid blade 560 is sized and shaped to fit between an upstream plate 573 and a downstream plate 574. The plates 573, 574 include one or more drilled holes or openings, as shown. The motor 550 may be connected to and controlled by the control unit 100 or controlled separately.

Whether manual or motorized, the backflow valve assembly 500a, 500b is adjustable, in some implementations, to generate a desired amount of backflow pressure in the elements located upstream. As the backflow valve assembly 500a, 500b is closed, the flow restriction increases, which in turn generates a higher backflow pressure. The backflow pressure increases the internal pressure inside the pressure vessel 300 and prolongs the duration of time for mixing inside the pressure vessel 300. The backflow pressure, to some extent, also affects the pressure and mixing time inside the mixing chamber 205 of the pump 200.

In another implementation, the backflow valve assembly 500 is not adjustable with a manual or motorized control. In this example, the backflow valve assembly 500 is custom-made and includes one or more internal components designed to restrict or modify the flow of fluid through the valve and to thereby generate a backflow pressure in the elements located upstream, as described herein.

Figure 4:
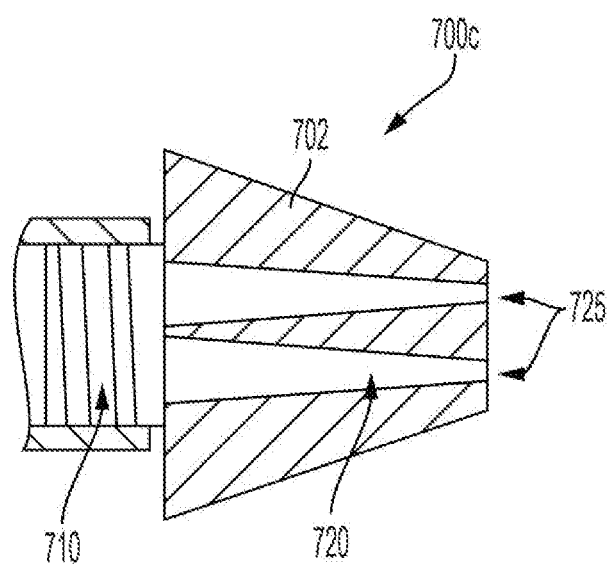
FIG. 4 is an illustration of a nozzle, according to some example implementations.

FIG. 4 is an illustration of a nozzle assembly 700c according to some example implementations. The nozzle assembly 700c includes a threaded connector 710 configured to attach to the outlet pipe 220. Like the pressure vessel 300 and the backflow valve assembly 500, the nozzle assembly 700c generates a backflow pressure into the system, which facilitates the additional injection of nanobubbles in the elements located upstream. In this aspect, the size and shape of the nozzle assembly 700c facilitates and helps maintain a consistent operating pressure throughout the system 1000.

The valve body 702, as shown, defines one or more flow passages 720 in fluid communication between the fluid inlet (through connector 710) and one or more fluid outlets 725. The flow passages 720 are converging toward the fluid outlets 725. In other words, the cross-sectional area of the flow passages 720 is decreasing as the fluid flows toward the outlets 725. The converging shape of the flow passages 720 may be formed by any of a variety of nozzle elements and commercially available designs. The converging shape of the flow passages 720 causes a rapid increase in flow velocity and a rapid decrease in pressure. The rapid pressure drop causes at least a portion of the gas nanobubbles to be released into the fluid in the reservoir 10. The gas nanobubbles that were once dissolved in the second solution, as they pass through the converging nozzle assembly 700c, are released from the second solution and injected into the fluid in the reservoir 10. This release of gas facilitates the destruction of pollutants and other contaminants in the fluid. For implementations in which the gas is an ozone-rich gas and the fluid is contaminated water, the release of nanobubbles creates hydroxyl radicals which are highly reactive and useful in destroying organic compounds and other contaminants in water.

Applications of the methods and systems described herein are useful for disinfecting bodies of water, such as lakes, wetlands, livestock waste pits, ballast water in watercraft, and wastewater ponds or tanks. Applications of the methods and systems described herein are useful for disinfecting the air in a room or other bounded space, including the surfaces, equipment, and other items in the room; for disinfecting medical equipment instead of or in addition to autoclaving; and for sterilizing fruits, vegetables, and other perishable foods.

Although several implementations and embodiments have been described herein, those of ordinary skill in art, with the benefit of the teachings of this disclosure, will understand and comprehend many other embodiments and modifications for this technology. This disclosure is not limited to the specific embodiments disclosed or discussed herein, and that may other embodiments and modifications are intended to be included within the scope of the description. Moreover, although specific terms are occasionally used herein, such terms are used in a generic and descriptive sense only and should not be construed as limiting the systems and methods described.

What is claimed is:

1. A system, comprising:
   a centrifugal pump for moving a fluid from a reservoir into a mixing chamber;
   a gas supply for injecting a first quantity of gas into said fluid inside said mixing chamber to produce a first solution containing a first volume of gas nanobubbles;
   a pressure vessel for receiving said first solution from said centrifugal pump, wherein said pressure vessel is configured to hold said first solution under an internal pressure and for a selected duration to produce a second solution, wherein said second solution contains a second volume of gas nanobubbles in addition to said first volume; and
   one or more nozzles for spraying said second solution into said reservoir, wherein said one or more nozzles is sized and shaped to release a portion of said volumes of gas nanobubbles into said fluid,
   wherein said centrifugal pump is configured to circulate said fluid in and through a circuit of elements comprising said reservoir, said centrifugal pump, said pressure vessel, and said one or more nozzles, until a desired quantity of pollutants is removed from said fluid.

2. The system of claim 1, wherein said circuit of elements further comprises:
   a backflow valve for receiving said second solution from said pressure vessel, wherein said backflow valve is configured to increase said internal pressure inside said pressure vessel, and to prolong said selected duration inside said pressure vessel,
   such that said pressure vessel produces a third solution, wherein said third solution contains a third volume of gas nanobubbles in addition to said first volume and said second volume.

3. The system of claim 1, wherein said circuit of elements further comprises:
   a Venturi injector for receiving said second solution from said pressure vessel, wherein said Venturi injector is configured to inject a supplemental quantity of gas into said fluid to produce a fourth solution, wherein said fourth solution contains a fourth volume of gas nanobubbles in addition to said first volume and said second volume.

4. The system of claim 3, wherein said circuit of elements further comprises:
   a recirculation pipe including a recirculation valve configured to deliver a selected portion of said second solution to said Venturi injector; and
   a supplemental gas inlet tube connected to a suction port of said Venturi injector to supply said supplemental quantity of gas,
   wherein said Venturi injector comprises a lengthwise chamber defined by a side wall and said suction port in said side wall, wherein said lengthwise chamber is sized and shaped to create a pressure differential sufficient to draw said supplemental quantity of gas through said suction port and into said select portion of said second solution.

5. The system of claim 1, wherein said first quantity of gas is an ozone-rich gas, and said gas supply comprises:
   an oxygen concentrator for converting ambient air into an oxygen-enriched gas;
   an ozone generator in fluid communication with said oxygen concentrator for converting said oxygen-enriched gas into said ozone-rich gas; and
   a gas inlet tube in fluid communication with said ozone generator and configured to deliver said ozone-rich gas to said mixing chamber inside said centrifugal pump.

6. The system of claim 1, wherein said pressure vessel further comprises:

a diverter pipe wall defining a chamber extending lengthwise and substantially vertically inside said pressure vessel from a base end to a distal end, wherein said chamber is in fluid communication with said pressure vessel and with a connecting pipe from said pump, wherein said diverter pipe wall further defines a plurality of perforations therethrough;

a vent positioned to release an excess volume of ozone-rich gas from said pressure vessel, said excess volume characterized by its having not been injected and dissolved into said first solution; and a deflector that is sized and shaped and positioned to selectively inhibit flow of said first solution into said vent, such that said deflector selectively prolongs said selected duration during which said first solution remains inside said pressure vessel.

7. The system of claim 1, wherein said one or more nozzles comprises a pair of nozzles spaced apart from one another and immersed in said reservoir to a depth located at a mean height above a floor of said reservoir, wherein each of said pair of nozzles comprises a nozzle body defining one or more flow passages converging toward one or more outlets.

* * * * *